(12) United States Patent
Zhang et al.

(10) Patent No.: US 7,388,852 B2
(45) Date of Patent: Jun. 17, 2008

(54) PHYSICAL LAYER ASSISTED RETRANSMISSION

(75) Inventors: Hang Zhang, Nepean (CA); Mo-Han Fong, L'Orignal (CA); Mark Earnshaw, Nepean (CA); Wei Huang, Nepean (CA); Yoon Chae Cheong, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1190 days.

(21) Appl. No.: 10/020,834

(22) Filed: Dec. 13, 2001

(65) Prior Publication Data

US 2003/0112759 A1 Jun. 19, 2003

(51) Int. Cl.
 *H04Q 7/20* (2006.01)
 *H04B 7/216* (2006.01)
 *H04L 12/56* (2006.01)

(52) U.S. Cl. .............. 370/335; 370/274; 370/331; 370/394; 455/446; 714/749

(58) Field of Classification Search .......... 370/338, 370/349, 394, 474, 310, 310.2, 316, 318, 370/320, 326, 327, 700, 332–335, 340–342, 370/348, 375, 380, 398, 503, 508, 241–258, 370/216, 277, 229–235.1, 209, 274, 331; 714/746–750; 455/421–450
See application file for complete search history.

(56) References Cited

U.S. PATENT DOCUMENTS

| 6,189,122 B1 * | 2/2001 | Cheng ................. 714/748 |
| 6,226,301 B1 * | 5/2001 | Cheng et al. ............ 370/474 |
| 6,330,451 B1 * | 12/2001 | Sen et al. ............. 455/452.2 |
| 6,512,754 B2 * | 1/2003 | Feder et al. ............ 370/338 |
| 6,519,233 B1 * | 2/2003 | Gutierrez ............... 370/320 |
| 6,606,311 B1 * | 8/2003 | Wang et al. ............. 370/338 |
| 6,611,515 B1 * | 8/2003 | Balachandran et al. ..... 370/349 |
| 6,718,500 B1 * | 4/2004 | Lee et al. .............. 714/749 |
| 6,760,860 B1 * | 7/2004 | Fong et al. .............. 714/4 |
| 6,765,896 B1 * | 7/2004 | Ahmed et al. ............ 370/338 |
| 6,778,558 B2 * | 8/2004 | Balachandran et al. ..... 370/470 |
| 6,895,010 B1 * | 5/2005 | Chang et al. ............ 370/394 |
| 6,931,569 B2 * | 8/2005 | Fong et al. ............. 714/748 |
| 6,980,658 B1 * | 12/2005 | Rezaiifar et al. ......... 380/274 |
| 7,032,153 B1 * | 4/2006 | Zhang et al. ............ 714/749 |

(Continued)

OTHER PUBLICATIONS

John M. Harris, Analytical Model for Radio Link Protocol for IS-95 CDMA Systems,0-7803-5718-3/00@2000,IEEE,2434-2438.*

*Primary Examiner*—Edan Orgad
*Assistant Examiner*—Venkatesh Haliyur
(74) *Attorney, Agent, or Firm*—Withrow & Terranova, PLLC

(57) ABSTRACT

The present invention provides a fast and efficient retransmission technique, which allows a link control layer to request retransmission of frames upon receiving information from an underlying physical layer that an unsuccessful attempt to transmit data was detected. In general, a failed attempt to transmit a frame is detected at a physical layer of a receiver. In response, the physical layer of the receiver sends a message to a link control layer of the receiver to indicate the failed attempt to transmit a frame was detected. Upon receipt of the message, the link control layer sends a retransmission message to a corresponding link control layer of a sender. The retransmission message is configured to cause the sender to retransmit the unrecoverable data associated with the corrupted frame.

21 Claims, 2 Drawing Sheets

U.S. PATENT DOCUMENTS 7,130,284 B2 * 10/2006 Lee et al. .................. 370/331
7,154,846 B2 * 12/2006 Chen et al. ................. 370/209
2002/0172192 A1 * 11/2002 Hunzinger et al. ......... 370/352
2002/0191544 A1 * 12/2002 Cheng et al. ............... 370/236

* cited by examiner

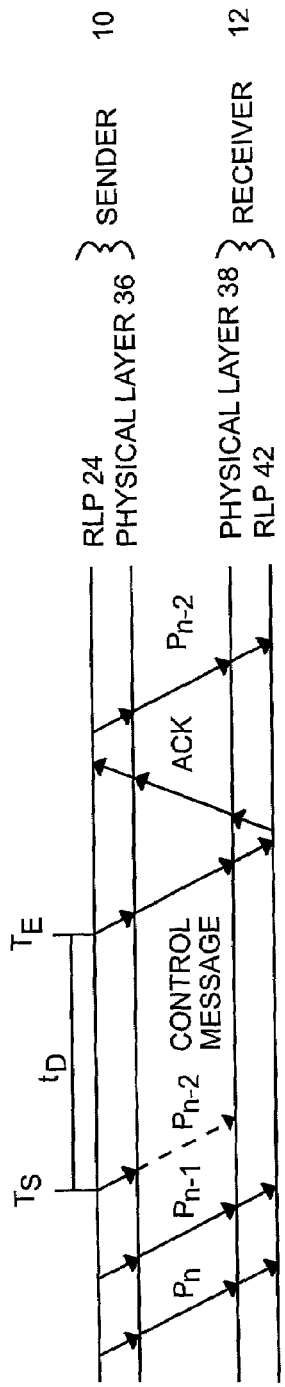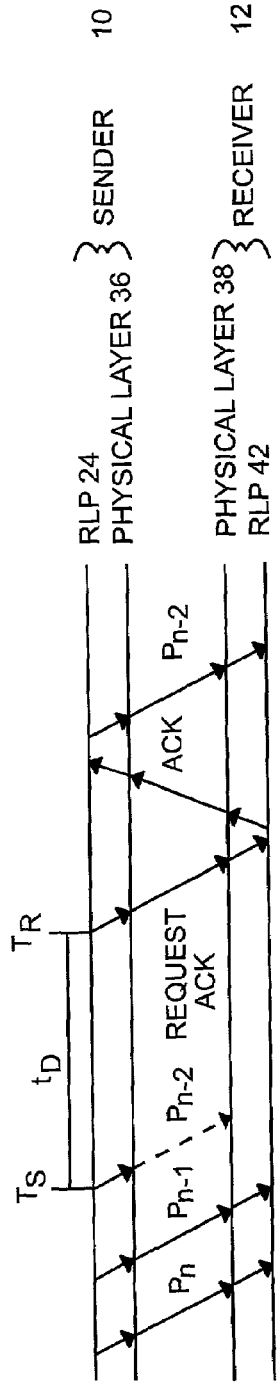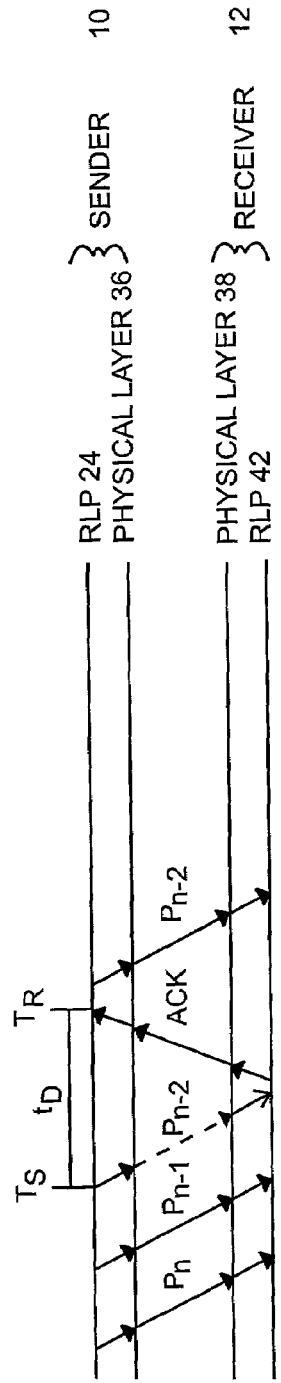

PHYSICAL LAYER ASSISTED RETRANSMISSION

FIELD OF THE INVENTION

The present invention relates to wireless communications, and in particular to using the physical layer to assist the control of retransmission of lost or corrupted data.

BACKGROUND OF THE INVENTION

A major objective of layer 2 protocols in wireless access networks is to provide improved radio link quality and reliability by implementing a retransmission mechanism for non-delay-sensitive services and applications. For the Global System for Mobile Communication (GSM) standard, the radio link protocol (RLP) uses automatic repeat request (ARQ) protocol. An Internet Protocol (IP) based RLP design allows an RLP frame to encapsulate an IP packet or fragment of an IP packet. Each RLP frame header includes a sequence number to maintain the integrity of RLP frames flowing over the wireless link. In a negative acknowledgement (NAK) based RLP ARQ scheme, after identifying the loss of an RLP frame at the receiver side RLP entity, a NAK message is sent to the transmitter side RLP entity. The NAK message triggers a retransmission of the RLP frame by the transmitter side RLP entity. Lost RLP frames are determined by checking the sequence numbers of RLP frames. Once an RLP frame is lost, a significant amount of time may pass before receiving a subsequent RLP frame, which is capable of providing information to determine that the previous RLP frame was lost. Such delays reduce overall throughput.

For example, the reception of RLP frames N and N+2 in a row indicates that RLP frame N+1 was lost. After receiving RLP frame N+2, the receiver side RLP entity sends a NAK to request retransmission of frame N+1. In a high-speed wireless Internet access system, arrival times for frames often vary greatly due to the high non-stream-like nature, or burstiness, of packet applications. If frame N+2 arrives at the receiver a relatively long time after N, then the receiver RLP layer will take a longer period of time to identify the possible loss of frame N+1. The result is a longer wireless link delay for frame N+1. Also, for a wireless access system with a shared downlink channel having a large bandwidth, a data transmission scheduler can further increase retransmission delays. For example, the scheduler may schedule frame N+2 a long time after scheduling packet N+1 due to the real-time traffic load, scheduling algorithms, and the like. Accordingly, the loss or corruption of frame N+1 will not be determined until frame N+2 is scheduled for transmission, transmitted and subsequently received.

Current detection and retransmission techniques significantly impair overall throughput to maintain an acceptable level of reliability or Quality of Service (QoS). Accordingly, there is a need to minimize the time required to identify lost or corrupt RLP frame and to decrease the delay in retransmitting the lost or corrupt RLP frames without sacrificing reliability.

SUMMARY OF THE INVENTION

The present invention provides a fast and efficient retransmission technique, which allows a link control layer to request retransmission of frames upon receiving information from an underlying physical layer that an unsuccessful attempt to transmit data was detected. In general, a failed attempt to transmit a frame is detected at a physical layer of a receiver. In response, the physical layer of the receiver sends a message to a link control layer of the receiver to indicate the failed attempt to transmit a frame was detected. Upon receipt of the message, the link control layer sends a retransmission message to a corresponding link control layer of a sender. The retransmission message is configured to cause the sender to retransmit the unrecoverable data associated with the corrupted frame.

In one embodiment, the link control layer implements a Radio Link Protocol (RLP) using an RLP entity associated with an application running on the receiver. The frames transmitted within the receiver are physical layer frames encapsulating all or a portion of one or more link control layer frames, which further encapsulate data provided from the applications. Accordingly, the retransmission message includes information identifying data or link control layer frames that have not been received by the receiver. Further, the message provided by the physical layer upon detecting a failed attempt to transmit a frame may be a primitive indicative of a failed attempt to receive frames in the physical layer. The retransmission message may be a negative acknowledgement (NAK) message.

During operation, the sender will receive the retransmission message at a link control layer; determine the data or a link control layer frame to retransmit; and retransmit the data or link control layer frame requiring retransmission. If a frame is totally lost and the attempt to transmit cannot be detected, alternative retransmission techniques are available. For example, for each link control layer frame sent via the physical layer from the sender to the receiver, a timer is set. The timer is reset if new data is sent before the expiration of the timer. If a timer for one of the link control layer frames expires, the sender may send a request message to the link control layer of the receiver requesting identification of the last portion of data or control layer frame received by the link control layer of the receiver. The link control layer of the receiver can reply by identifying the last data or frame received to help the sender identify the data or frames to retransmit.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 is a frame flow diagram of a first retransmission technique of the prior art.

FIG. 3 is a frame flow diagram of a second retransmission technique of the prior art.

FIG. 4 is a frame flow diagram of a retransmission technique accordingly to one embodiment of the present invention.

DETAILED DESCRIPTION OF THE PREFERRED EMBODIMENTS

Figure 1:
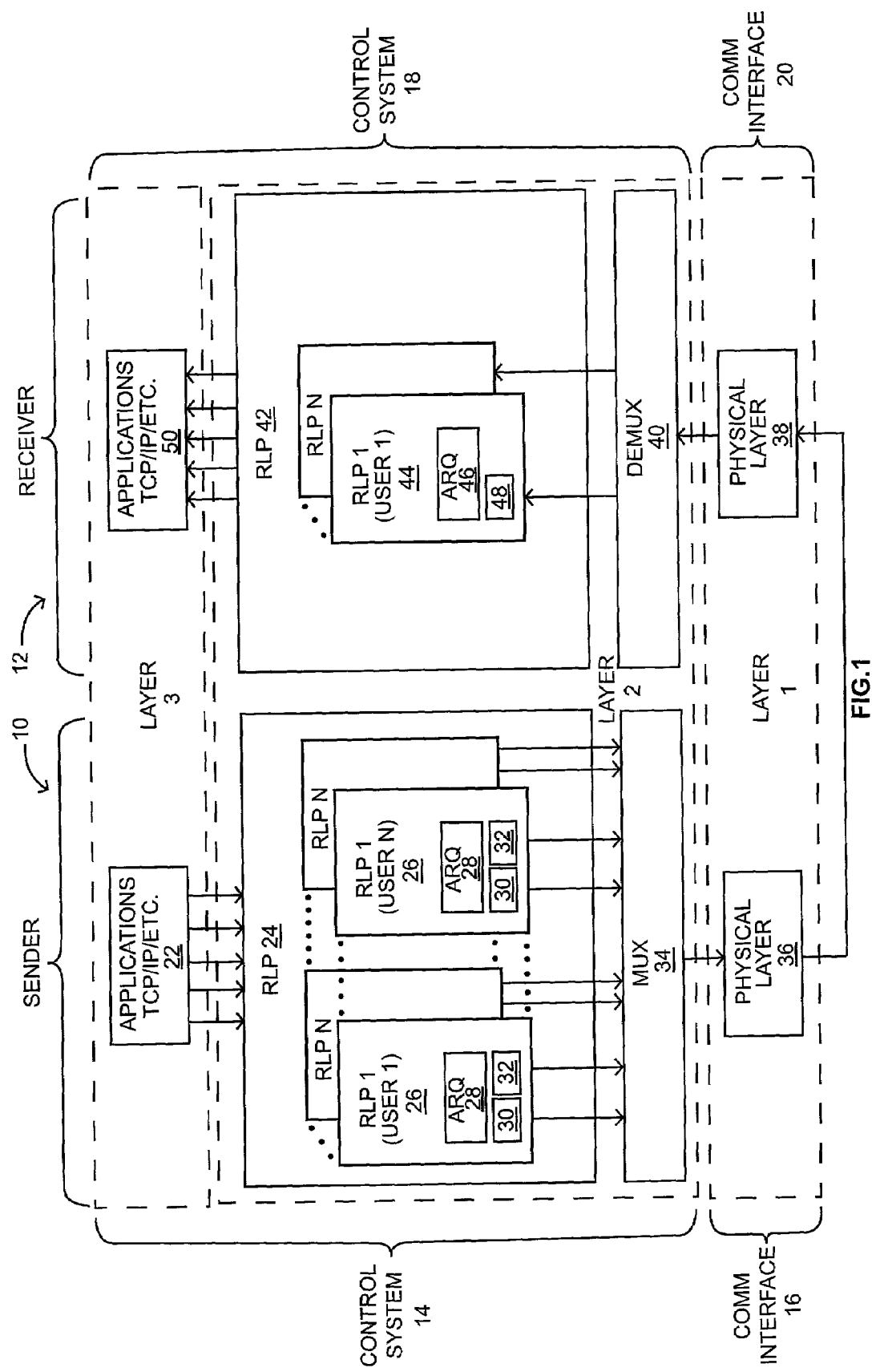
FIG. 1 illustrates the physical and logical architecture of a wireless communication system according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Turning now to FIG. 1, a physical and logical architecture of a wireless communication system according to one embodiment of the present invention is illustrated. For the purposes of description, a sender architecture 10 is configured to transmit data in frames to a receiver architecture 12. In operation, both the sender and receiver architectures 10, 12 cooperate to facilitate bi-directional communications. The sender architecture 10 includes a control system 14 and a communication interface 16. The control system will have sufficient memory to store software and data for operation. Similarly, the receiver architecture 12 also includes a control system 18 and compatible communication interface 20.

The sender's control system 14 supports applications and layer 3 and higher communication protocols 22, such as the Internet Protocol (IP) and Transport Control Protocol (TCP) suite. The layer 2 link control protocol is preferably the Radio Link Protocol (RLP) provided by an RLP layer 24, which normally assigns an RLP entity 26, RLP 1 through RLP N, for each layer 3 application 22 and user, user 1 through user N, which requires communication capability. Each RLP entity 26 will encapsulate all or a portion of one or more packets from the layer 3 applications and protocols 22 into RLP frames.

Each RLP entity 26 is associated with an automatic repeat request (ARQ) function 28, which controls retransmission of lost or corrupted RLP frames. The ARQ function is associated with a data buffer 30 for buffering RLP frames being transmitted and a retransmit buffer 32 for storing RLP frames that have been transmitted in case retransmission is required. A multiplexor (MUX) function 34 is used to multiplex RLP frames received from the various applications across multiple users for transmission by the communication interface 16.

At the physical layer 36, the communication interface 16 will use a layer 1 protocol to encapsulate all or a portion of one or more RLP frames into medium access control (MAC) frames for transmission to the receiver's communication interface 20 and processing by the physical layer 38 using the layer 1 protocol. The MAC frames received by the communication interface 20 are processed to recover the RLP frames, which are demultiplexed using a demultiplexor (DEMUX) function 40 and delivered to the appropriate layer 2 RLP entity 44 of the layer 2 RLP 42. For each RLP entity 44, the received RLP frames are stored in a re-synchronization buffer 48 in cooperation with the ARQ function 46. Since the MAC frames, and thus the RLP frames, may be received out of order, the re-synchronization buffer 48 is used to place the received RLP frames in proper order prior to delivering the data to the applications 50 using the layer 3 and higher protocols. The ARQ function 46 monitors incoming data and may request retransmission of lost or corrupted RLP frames. For the purpose of this disclosure, physical layer frames include MAC frames or other transport frames of the physical layers 36, 38.

With reference to FIG. 2, an exemplary retransmission scheme of the prior art is illustrated. After sending each RLP frame $P_n$, $P_{n-1}$, and $P_{n-2}$, a timer of time $t_D$ is initiated at time $T_S$ at the sender's RLP entity 26. If the next frame is scheduled before the timer expires at time $T_E$, the timer is reset and the process continues. Otherwise, upon expiration of the timer at time $T_E$, the sender's RLP entity 26 transmits an RLP control message, which identifies the RLP frame or the last data that was transmitted, or simply resends the last RLP frame again.

Typically, the sender's RLP entity 26 sequentially numbers the RLP frames as they are transmitted. During reception, the receiver's RLP entity 44 will use the numbering to synchronize the transmitted RLP frames as well as help identify lost RLP frames. Alternatively, the sender's RLP entity 26 may number or otherwise keep track of the number of octets, or similar measure, of data transmitted. The receiver's RLP entity 44 will likewise count the number of octets, or similar measure, of data to track the incoming data and help detect the loss of RLP packets. The control message will include sufficient information to allow the sender's RLP entity 26 to identify the last data or RLP frame, $P_{n-2}$, received by the receiver's RLP entity. Preferably, the control message is protected with a higher level of reliability than is the data traffic by using a more robust modulation technique, which is less susceptible to conditions causing loss or corruption of data.

Upon receipt of the control message, the receiver's RLP entity 44 checks if it has received all of the transmitted data based on the information provided in the control message. If the control message identifies that the sequence number of data or an RLP frame in the control message is greater than that which has been received so far, then one or more RLP frames were likely lost. In the example of FIG. 2, the last RLP frame transmitted is $P_{n-2}$, but the last RLP frame received is $P_{n-1}$, which indicates that RLP frame $P_{n-2}$ has been lost. If one or more RLP frames were lost, an acknowledgement (ACK) message identifying the lost data or RLP frames is generated and sent to the sender's RLP entity 24. In response, the sender's RLP entity 26 will retransmit the lost data or RLP frame $P_{n-2}$. In this way, the receiver's RLP entity 44 does not have to wait until the next RLP frame's arrival before determining if any RLP frames were lost; however, the timer value is fixed and is not based on providing a desired QoS. As illustrated, significant delays are often incurred prior to detecting the loss of RLP frames.

With reference to FIG. 3, another exemplary retransmission scheme of the prior art is illustrated. After sending an RLP frame, two timers are initiated at the sender's RLP entity 26. The timing of the first timer is depicted and is initiated at time $T_s$, which corresponds to the transmission of the last RLP frame transmitted $P_{n-2}$, and set to expire after a time $t_D$, at time $T_R$. Expiration of the first timer is indicative that the sender's RLP entity 26 does not yet know if the receiver's RLP entity 44 has a valid copy of the RLP frame. The sender's RLP entity 26 sends an acknowledgement (ACK) request signal to the receiver's RLP entity 44 requesting the RLP entity 44 to identify the sequence number of the most recently received RLP frame. Upon receipt of the ACK request, the receiver's RLP entity 44 will send an ACK identifying the sequence number of the most recently received RLP frame, which is RLP frame $P_{n-1}$ in FIG. 3. Upon receiving the ACK, the sender's RLP entity 26 will determine that RLP frame $P_{n-1}$, was the last RLP frame received by the receiver's RLP entity 44 and retransmit RLP frame $P_{n-2}$.

If no response is obtained before the second timer expires, the sender's RLP entity 26 assumes that the receiver does not have a copy of that RLP frame and retransmits the RLP frame. The timers are cancelled if the sender's RLP entity 26 is able to determine either that the receiver has a copy of the RLP frame in question or will be requesting it via the NAK procedure. Periodic ACK signals may also be sent by the receiver's RLP entity 44 to reduce the overall amount of signaling over the communication medium. The timer values are usually set according to the desired QoS delay bounds for the data traffic being transmitted; however, the delay in detecting missing frames is significant and results in reduced throughput.

The present invention provides a QoS-based solution, which cooperates with the physical layer 38 of the receiver 12 to provide faster detection of lost or corrupt frames. RLP frames need to be retransmitted in two different situations. In the first case, the transmitted RLP frames are totally lost and the receiver 12 cannot detect any signal. In the second and most common case, enough of the transmitted signal can be received to indicate a MAC frame was transmitted, but not properly decoded. For the latter scenario, the physical layer 38 can send a primitive, or like signal, to the RLP entity 44 to inform it that an attempt to transmit a frame was made, but the frame was not properly received. An existing primitive capable of providing such information is the primitive used to calculate frame error rates and ultimately control transmit-power levels. Upon receiving the primitive from the physical layer 38, the receiver's RLP entity 44 will create and send an ACK message to the sender's RLP entity 26. In response, the sender's RLP entity 26 will retransmit the last RLP frame or frames much more quickly than when using the other available solutions.

For the present invention, an assumption is made that the user ID for RLP frames can be detected correctly with a much higher level of reliability than for data traffic. If only one application, and thus, one RLP entity for the sender 10 and receiver 12, are being used, then the user ID for the RLP frames is automatically known. If multiple applications and RLP entities are active, then additional information and/or channels may be used to send identification information using robust modulation or coding techniques.

With reference to FIG. 4, operation of an exemplary embodiment of the present invention is illustrated. Upon sending each RLP frame P, $P_{n-1}$, and $P_{n-2}$, the sender's RLP entity 26 sets a timer with a fixed value, $t_D$. At the receiver 12, if an attempt to receive a corrupted MAC frame, which is likely carrying RLP frame $P_{n-2}$, is detected, the physical layer 38 immediately sends a primitive to the corresponding RLP entity 44 to indicate that a corrupted frame has been detected. Next, the receiver's RLP entity 44 sends an ACK signal to the sender's RLP entity 26 identifying the last octet of data received or the synchronization number for the last received RLP frame $P_{n-1}$. Upon receiving the ACK signal identifying the last received data or RLP frame, the sender's RLP entity 26 will assume the corrupted RLP frame is $P_{n-1}$. The sender's RLP entity 26 will then reset the timer for the corrupted RLP frame $P_{n-2}$, retransmit the corrupted RLP frame $P_{n-2}$, and set a timer upon retransmitting the previously corrupted RLP frame $P_{n-1}$. The sender's ARQ function 28 will typically access the resynchronization buffer 32 to identify the lost data or RLP frame based on previous transmissions and access the data or RLP frame to retransmit.

In case the technique of the present invention cannot detect an attempt to deliver a MAC frame due to severe fading, other retransmission schemes may be implemented. For instance, the prior art retransmission schemes such as those described in association with FIGS. 2 and 3 can be used to recover the lost RLP frame when the present invention does not initiate retransmission by the time the timer expires. In an embodiment according to FIG. 2, the sender's RLP entity 26 may transmit a message identifying the last octet of data that was sent to provide information to allow the receiver's RLP entity 44 to identify missing RLP frames when the timer expires. In response, the receiver's RLP entity 44 replies by identifying the last octet of data that was received. If the identification or synchronization number for the last octet of data is higher than that associated with the most recently transmitted octet of data, retransmission is invoked.

In an embodiment according to FIG. 3, the sender's RLP entity 26 may transmit a message identifying the last RLP frame transmitted to provide information to allow the receiver's RLP entity 44 to identify missing RLP frames when the timer expires. In response, the receiver's RLP entity 44 replies with the highest sequence number associated with recently received RLP frames. If the highest sequence number of the most recently transmitted frame is higher than that associated with the most recently received frames, retransmission is invoked.

In essence, the present invention provides a retransmission technique capable of detecting transmission errors and initiating retransmission faster than the techniques of the prior art and may act as a supplement to these prior art techniques. The retransmission technique of the present invention allows a link control protocol layer to request retransmission of frames upon receiving information from the physical layer that an unsuccessful attempt to transmit data was detected. Those skilled in the art will recognize improvements and modifications to the preferred embodiments of the present invention. All such improvements and modifications are considered within the scope of the concepts disclosed herein and the claims that follow.

What is claimed is:

1. A method for initiating retransmission of frames comprising:
 a) detecting a failed attempt to transmit a frame at a physical layer of a receiver;
 b) sending a message from the physical layer of the receiver to a link control layer of the receiver to indicate the failed attempt to transmit a frame has been detected; and
 c) upon receipt of the message, sending a retransmission message from the link control layer of the receiver, the retransmission message configured to cause a sender to retransmit data associated with the frame,
 wherein the link control layer implements a Radio Link Protocol (RLP) using an RLP entity associated with an application, and
 wherein the frame is a physical layer frame encapsulating data represented by an RLP frame and the sending step further comprises generating the retransmission message to include identification for one of the group consisting of a recently received RLP frame and recently received data such that the sender can identify data or an RLP frame to retransmit.

2. The method of claim 1 wherein the detecting step further comprises receiving at least a portion of the frame and determining at least a portion of the data associated with the frame is either unrecoverable or corrupted.

3. The method of claim 1 wherein the frame is a physical layer frame, the method further comprising:
   a) receiving the retransmission message at a link control layer of the sender;
   b) determining data or a link control layer frame to retransmit; and
   c) retransmitting the data or link control layer frame requiring retransmission.

4. The method of claim 1 wherein retransmission message is an acknowledgement message.

5. The method of claim 1 further wherein the frame is a physical layer frame, the method further comprising:
   a) sending link control layer frames from the sender over a wireless communication channel to the receiver via physical layer frames from the sender;
   b) setting a timer upon transmitting each of the link control layer frames from the sender; and
   c) resetting the timer upon confirmation the link control layer frames were received or a subsequent link control layer frame is sent.

6. The method of claim 5 wherein when a timer for one of the link control layer frames expires, sending one of the group consisting of a request message to the link control layer of the receiver from the sender requesting identification of a last portion of data or link control layer frame received by the link control layer of the receiver and data or a link control layer frame associated with the timer expiration.

7. A communication system comprising a control system and a communication interface that cooperate to provide a physical layer and a link control layer adapted to:
   a) detect a failed attempt to transmit a frame at the physical layer;
   b) send a message from the physical layer to the link control layer to indicate that the failed attempt to transmit the frame has been detected; and
   c) upon receipt of the message, send a retransmission message from the link control layer to a sender to cause the sender to retransmit data associated with the frame,
   wherein the link control layer implements a Radio Link Protocol (RLP) using an RLP entity associated with an application, and
   wherein the frame is a physical layer frame encapsulating data represented by an RLP frame and the link control layer generates the retransmission message to include identification for one of the group consisting of a recently received RLP frame and recently received data such that the sender can identify data or an RLP frame to retransmit.

8. The communication system of claim 7 wherein the physical layer receives at least a portion of the frame and determines at least a portion of the data associated with the frame is either unrecoverable or corrupted.

9. The communication system of claim 7 wherein the frame is a physical layer frame and further comprising a sender control system and a communication interface cooperating to provide a physical layer and a link control layer for the sender to:
   a) receive the retransmission message at a link control layer of the sender;
   b) determine data or a link control layer frame to retransmit; and
   c) retransmit the data or link control layer frame requiring retransmission.

10. The communication system of claim 7 wherein retransmission message is an acknowledgement message.

11. The communication system of claim 7 wherein the frame is a physical layer frame and further comprising a sender control system and a communication interface cooperating to provide a physical layer and a link control layer forte sender to:
   a) send link control layer frames over a wireless communication channel to the receiver via physical layer frames from the sender;
   b) set a timer upon transmitting each of the link control layer frames from the sender; and
   c) reset the timer upon confirmation that the link control layer frames were received or a subsequent link control layer frame is sent.

12. The communication system of claim 11 wherein when the timer for one of the link control layer frames expires, the link control layer of the sender sends one of the group consisting of a request message to the link control layer of the receiver requesting identification of a last portion of data or control layer frame received by the link control layer of the receiver and data or a link control layer frame associated with the timer expiration.

13. A computer readable medium encoded with a computer program comprising instructions to instruct a processor to control a physical layer and a link control layer, such that the physical layer and the link control layer to-cooperate to:
   a) detect a failed attempt to transmit a frame at the physical layer;
   b) send a message from the physical layer to the link control layer to indicate that the failed attempt to transmit a frame has been detected; and
   c) upon receipt of the message, send a retransmission message from the link control layer to a sender to cause the sender to retransmit data associated with the frame,
   wherein the link control layer implements a Radio Link Protocol (RLP) using an RLP entity associated with an application, and
   wherein the frame is a physical layer frame encapsulating data represented by an RLP frame and the link control layer generates the retransmission message to include identification for one of the group consisting of a recently received RLP frame and recently received data such that the sender can identify data or an RLP flame to retransmit.

14. The computer readable medium of claim 13 wherein the physical layer receives at least a portion of the frame and determines that at least a portion of the data associated with the frame is either unrecoverable or corrupted.

15. The computer readable medium of claim 13 wherein the frame is a physical layer frame, and wherein the computer program further comprises instructions to instruct a sender control system and a communication interface to cooperate to provide a physical layer and a link control layer for the sender to:
   a) receive the retransmission message at a link control layer of the sender;
   b) determine data or a link control layer frame to retransmit; and
   c) retransmit the data or link control layer frame requiring retransmission.

16. The computer readable medium of claim 13 wherein retransmission message is an acknowledgement message.

17. The computer readable medium of claim 13 wherein the frame is a physical layer frame, and wherein the computer program further comprises instructions to instruct a sender control system and a communication interface to cooperate to provide a physical layer and a link control layer for the sender to:
- a) send link control layer frames over a wireless communication channel to the receiver via physical layer frames from the sender;
- b) set a timer upon transmitting each of the link control layer frames from the sender; and
- c) reset the timer upon confirmation that the link control layer frames were received or a subsequent link control layer frame is sent.

18. The computer readable medium of claim 17 wherein when a timer for one of the link control layer frames expires, the link control layer of the sender sends one of the group consisting of a request message to the link control layer of the receiver requesting identification of a last portion of data or control layer frame received by the link control layer of the receiver and data or a link control layer frame associated with the timer expiration.

19. The method of claim 1 wherein the message is a primitive indicative of a failed attempt to receive frames in the physical layer.

20. The communication system of claim 7 wherein the message is a primitive indicative of a failed attempt to receive frames in the physical layer.

21. The computer readable medium of claim 13 wherein the message is a primitive indicative of a failed attempt to receive frames in the physical layer.

* * * * *